United States Patent
Fleming, Jr.

[11] 4,033,667
[45] July 5, 1977

[54] MULTIMODE OPTICAL FIBER

[75] Inventor: James William Fleming, Jr., Fanwood, N.J.

[73] Assignee: Bell Telephone Laboratories, Incorporated, Murray Hill, N.J.

[22] Filed: Sept. 12, 1975

[21] Appl. No.: 612,626

[52] U.S. Cl. .................. 350/96 WG; 350/96 GN; 350/175 GN
[51] Int. Cl.² .......................................... G02B 5/14
[58] Field of Search ......... 350/96 WG, 96 B, 96 R, 350/96 GN, 175 GN; 106/54, 50

[56] References Cited

UNITED STATES PATENTS

| | | | |
|---|---|---|---|
| 3,614,197 | 10/1973 | Nishizawa et al. | 350/96 WG |
| 3,823,997 | 7/1974 | Gloge et al. | 350/96 WG |
| 3,904,268 | 9/1975 | Keck et al. | 350/96 WG |

OTHER PUBLICATIONS

Macchesney; J. B., O'Conner; P. B., Presby; H. M., "A New Technique For Preparation of Low Loss . . ." Proc. of IEEE, Sept. 1974, pp. 1280–1281.

Payne; D. N., Gambling, "New Silica-Based Low-Loss Optical Fibre" Elect. Lett. vol. 10, No. 15, July 25, 1974, pp. 289–290.

*Primary Examiner*—John K. Corbin
*Assistant Examiner*—Rolf Hille
*Attorney, Agent, or Firm*—George S. Indig

[57] ABSTRACT

A multimode optical fiber waveguide with graded refractive index for lessening modal dispersion depends upon simultaneous grading of both $P_2O_5$ and $B_2O_3$ within an otherwise generally unmodified silica glass. $P_2O_5$ is at a maximum in the axial core region, while $B_2O_3$ is generally the only modifier in the peripheral core region. The defined profile, which depends critically upon $P_2O_5$ content in the axial composition and somewhat less critically upon the $B_2O_3$ peripheral composition content, is near optimum from the standpoint of mode dispersion and remains so for the entire useful range of carrier wavelength (generally defined as from 0.5 to 1.1 $\mu$m). Numerical aperture for fibers of the invention are typically at a level of 0.3.

4 Claims, 2 Drawing Figures

MULTIMODE OPTICAL FIBER

BACKGROUND OF THE INVENTION

1. Field of the Invention

The invention is concerned with multimode fibers for use as transmission lines in communications systems operating in the visible or near-visible spectra. Fibers of concern include a core region with decreasing refractive index from the center of the core in a radial direction. The purpose of the gradient is to compensate for the differing mode-dependent group velocities so as to lessen pulse spreading due to this mechanism.

2. Description of the Prior Art

Optical communications systems under general study popularly depend on a glass fiber transmission guide. A form under widespread investigation designed for use over medium and long distances utilizes a guide of sufficiently large dimension to accommodate many modes in addition to the fundamental. Multimode transmission guides have the advantage of energy conservation of particular interest for a particular class of radiation sources now available. An early recognized disadvantage of multimode transmission as the mode-dependent group velocity resulting in increasing residence time for higher order modes. The result of this "mode dispersion" phenomenon is to lessen the usable bandwidth of the system. This is most easily visualized for a pulse system in which the pulse broadens during transmission due to the varying differing group velocities of the many modes entering into its composition. The ultimate bandwidth limitation coincides with sufficient distance to result in smearing of successive pulses (or in the smearing of successive information bits in analog systems—e.g., the disappearance of amplitude variations in an AM system).

Workers have recognized for some time that modal dispersion may be lessened by providing a refractive index variation such as to compensate for mode-dependent group velocity variations. In simple terms, this approach provides a lower index and, therefore, more rapid medium in the outer sections of the core through which a statistically greater fraction of the higher mode energy is transmitted.

For some time it was believed that a parabolically varying index would accomplish minimization of mode dispersion. This initially simple concept has evolved into a somewhat more complex gradient function which takes into account the previously ignored dispersive effect due to the index-modifying dopant introduced to accomplish the desired variation. This has culminated in a paper by Robert Olshansky and Donald B. Keck published at page TuC5-1 et seq. of the technical digest *Optical Fiber Transmission*, (a digest of technical papers presented at the Topical Meeting on Optical Fiber Transmission, Jan. 7–9, 1975, Williamsburg, Va.).

It was early recognized that minimum mode dispersion coincides with a gradient defined by the equation:

$$n = n_1[1-2\Delta (r/a)^\alpha ]^{1/2} \quad (1)$$

(see 52, *Bell System Technical Journal*, p. 1563 (1973)) in which $n_1$ is the index maximum, $r$ is the distance from the fiber axis, $a$ is the core radius, $\Delta$ is the relative index difference between core center and cladding, $\alpha$ is a power law exponent which characterizes the profile.

In accordance with Olshansky and Keck, supra., $\alpha$ is defined as:

$$\alpha = 2 + y - \Delta \frac{(4+y)(3+y)}{(5+2y)} \quad (2)$$

$$\text{in which } y \text{ is} = \frac{-2n_1}{N_1} \frac{\lambda}{\Delta} \frac{d\Delta}{d\lambda}, \quad (3)$$

$N_1$ is the axial group refractive index and $\lambda$ is the wavelength. The function $y$ was obtained from measurements made on bulk glass. The factor now found to be of significance involves the wavelength dependence of the refractive index. The main drawback of graded fibers produced in accordance with the above teaching is wavelength dependence of optimal profile. Whereas, the earlier assumption suggesting an $\alpha$ value equal to 2 led to a gradient which was wavelength independent, incorporation of the later teachings results in the need for tailoring $\alpha$ to a specific contemplated carrier wavelength. Disadvantages are apparent. Fiber manufacturers must produce a family of fibers with members designed for specific source and detector pairs. Fibers once installed may not be directly adapted to improved source-detector pairs if such improvement results in a significant shift in carrier frequency.

SUMMARY OF THE INVENTION

Multimode fibers manifesting a wavelength independent near optimal guiding (minimum pulse spreading) are described. Guides of the invention depend upon the use of a double dopant system in a high silica glass with both dopants at a critical level. Dependence is had upon an axial core composition which is essentially phosphosilicate graded to a peripheral core composition which is essentially borosilicate. While the boron oxide content at the peripheral core region may range from 10–20 mole percent, the phosphorous containing dopant, $P_2O_5$, is present in the core region at the somewhat more narrowly defined compositional range of from 10–15 mole percent.

As described in the Detailed Description, optimal multimode guiding may be defined in terms of an exponent value $\alpha$ as present in an equation set forth in 52, *Bell System Technical Journal*, page 1563 (1973). The $\alpha$ value for the range of wavelengths studied—i.e., from 0.5 $\mu$m to 1.1. $\mu$m—is found to be equal to approximately 1.90.

DETAILED DESCRIPTION

1. Characterization of the Inventive Profile

It is convenient to describe the refractive index profile in terms of the exponent $\alpha$ in equation (1):

$$n = n_1 \left[ 1 - 2\Delta \left(\frac{r}{a}\right)^\alpha \right]^{1/2}.$$

in which $n_1$ is the index maximum, $r$ is the distance from the fiber axis, $a$ is the core radius, $\Delta$ is the relative index difference between the core center and cladding and $\alpha$ is a power law exponent which characterizes the profile.

The equation set forth in the preceding paragraph is developed in 52, *Bell System Technical Journal*, page 1563 (1973). At this time, the equation has received acceptance of workers as defining the desired multimode gradient; and background, as well as mathematical development, is not repeated in this description. The invention is concerned with the value of $\alpha$ in the above equation and, more specifically, with compositions manifesting a substantial independence of such a value on wavelength.

2. The Figures

Figure 1:
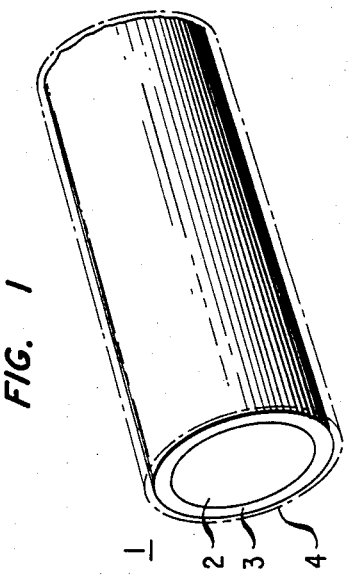
FIG. 1 is a perspective view of a fiber section in accordance with the invention.

FIG. 1 depicts a guide 1 which includes a core section 2, a clad region 3, as well as an optional coating 4. The inventive teaching is largely concerned with core region 2 which evidences a gradient in refractive index. The gradient which defines a symmetrically reducing refractive index from the center of core 2 to the interface between core 2 and clad 3 is of the form represented by equation 1. The inventive teaching is largely concerned with the value of $\alpha$ as assigned to a core region in which the peripheral portion (that portion at or immediately within the interface between core 2 and clad 3) is primarily borosilicate and in which the axial composition core 2 is primarily phosphosilicate.

Figure 2:
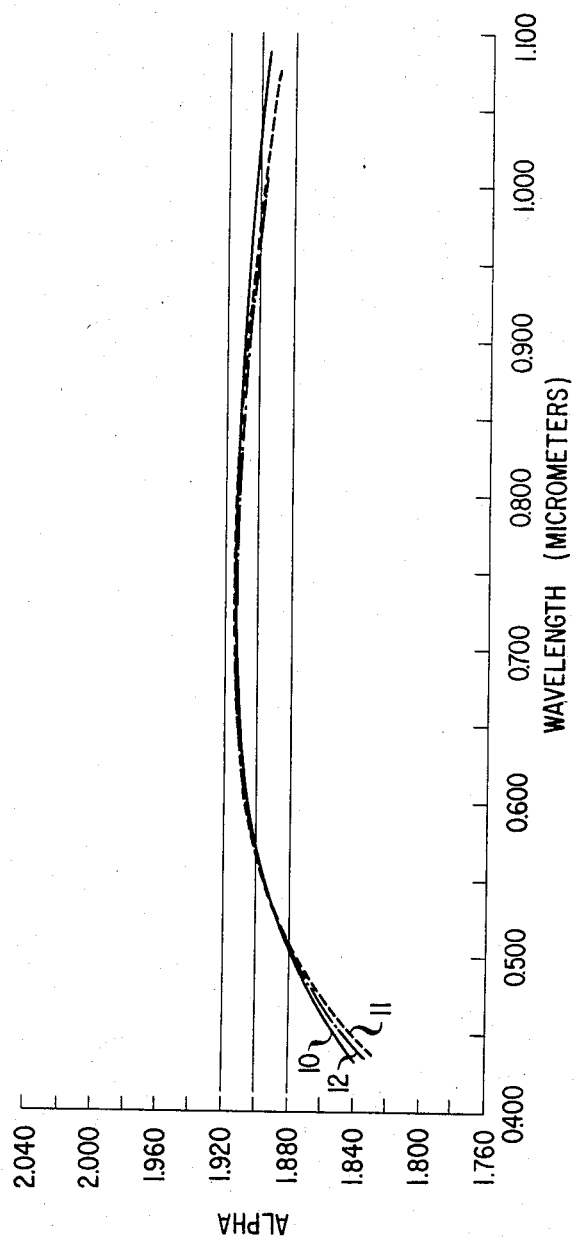
FIG. 2, on coordinates of $\alpha$ on the ordinate and wavelength in micrometers on the abscissa, shows the relationship between these two values for three fibers, each within the ternary system phospho-borosilicate, one curve representing optimal composition from the standpoint of independence of $\alpha$ on wavelength; and the other two representing the extreme permitted compositions in accordance with the inventive teaching.

The invention is generally described in terms of the preferred embodiment as represented by Curve 11 of FIG. 2. In this preferred composition, the axial composition is approximately 12 mole percent $P_2O_5$, remainder $SiO_2$; while the peripheral core composition is essentially 14 mole percent $B_2O_3$, remainder $SiO_2$. It will be seen that the composition of the peripheral region is somewhat less critical so that the relatively broad range of from 10–20 mole percent $B_2O_3$, remainder $SiO_2$, is permitted. This flexibility is believed due to the fact that the lowered index in the peripheral core region is largely due to the structural change accompanying the $B_2O_3$ modifier rather than to the compositional change, per se. It follows that the structural change associated with borosilicate as distinguished from silica is not strongly composition-dependent over the range noted. As discussed further on, the inventive teaching is somewhat greater in breadth largely in recognition of the fact that improvement in independence of optimal $\alpha$ on wavelength, as compared with other suggested fibers of such $na$ value of approximately 0.3 and greater, is still significant over the range of from approximately 10 mole percent $P_2O_5$, remainder $SiO_2$, to 15 mole percent $P_2O_5$, remainder $SiO_2$.

It is well known that practical considerations, such as microbending, give rise to a desire for increased values of numerical aperture. Accordingly, workers practicing the inventive teaching may deviate still further from optical independence of $\alpha$ on wavelength to accomplish this end. The objective is best served by increasing $P_2O_5$ content in the axial region to values somewhat in excess of the indicated range. Alternatively, it is possible to maintain relative independence while increasing numerical aperture by use of still an additional index modifying ingredient in the axial region.

Clad region 3 is primarily responsible for optical guiding. It is generally, although not necessarily, of constant refractive index, and within the context of this invention is likely to consist of borosilicate of an index equal to that of the ultimate low value attained in the gradient within the core. Commonly, such a borosilicate clad may consist of 14 mole percent boron oxide, remainder silica. A more general range may be defined as lying between 10–20 mole percent boron oxide, remainder silica.

Coating 4, shown in phantom, is optional and, in general, serves no optical function. It may consist of a silica layer and/or an organic layer designed to prevent microscratching during processing.

FIG. 2, on coordinates of $\alpha$ on the ordinate and wavelength in micrometers on the abscissa, includes three curves showing the interrelationship between these two parameters. Curve 10 is plotted from data 4, a fiber the axial core composition of which consists of 10 mole percent $P_2O_5$, remainder $SiO_2$. Curve 11 is for such a fiber in which the $P_2O_5$ axial core composition is 12 mole percent, remainder $SiO_2$; and Curve 12 corresponds with such a fiber in which the $P_2O_5$ content at the core axis is 15 mole percent. As has been indicated, the peripheral composition is essentially borosilicate, and modifier content, in this instance $B_2O_3$, is somewhat less critical. For purposes of comparison, fibers represented by the three curves are all for peripheral core compositions of approximately 14 mole percent $B_2O_3$, remainder $SiO_2$. Variation of $B_2O_3$ content over the range of from about 10 mole percent to about 20 mole percent has only a minimal effect on the magnitude of the values plotted.

The inventive teaching is largely directed to independence of optimal $\alpha$ on wavelength. It is seen that the fiber of Curve 11 (axial composition approximately 12 mole percent $P_2O_5$, remainder $SiO_2$) may, accordingly, be considered as representing a preferred embodiment. Variations in $\alpha$ dependence, represented by off optimal axial compositions of fibers represented by Curves 10 and 13, are seen to lie within the general range of $\pm 2$ percent.

From a more general design standpoint, however, it is significant to note that the numerical aperture of the fiber represented by Curve 12 ($na_{Curve\ 12} = 0.3$, while $na_{Curve\ 11} = 0.28$, and $na_{Curve\ 10} = 0.26$) is increased as is to be expected for larger $P_2O_5$ doping. It has been indicated that large $na$ is generally advantageous for real structures in which microbending or other deviations from theoretical structure may result in loss of higher order mode energy. The inventive teaching may, therefore, be construed as suggesting that axial composition which yields the highest possible $na$ commensurate with a tolerable independence of $\alpha$ on wavelength. It follows that the fiber of Curve 12 is to be compared to that of Curve 10, and as suggested above, that still further increase in axial $P_2O_5$ doping level or inclusion of an additional index modifier may be desired where still greater dependence of $\alpha$ on wavelength may be tolerated.

3. Design Criteria

It is important to consider the relationship of this inventive teaching to that contained in copending United States application Ser. No. 612,646, filed on Sept. 12, 1975, now U.S. Pat. No. 3,989,350. In that copending application, it is observed that the optimal mode guide index profile in the core deviates from the various teachings of the prior art. As there described, the appropriate profile is distinctive in large part by reason of the index variation dependence on structure rather than on composition, per se. Perhaps an ancillary characteristic of the simple binary borosilicate embodiment of that copending application is as significant to the design engineer. That characteristic is relative insensitivity of optimal profile (sometimes in terms of the exponent $\alpha$) on wavelength. Clearly, that teaching permits, possibly for the first time, fabrication of a multimode fiber with very small pulse spreading without regard to the specific carrier wavelength. In this still developing technology, this may be of extreme importance to the manufacturer who rather than being confronted with the need to custom design each fiber for a specific desired source can direct his efforts to one standardized structure. This may be significant, too, for existing installations which may be directly adapted to improved sources and detectors regardless of center wavelength.

From the practical standpoint, there is a minor drawback to this otherwise excellent binary borosilicate graded system. Feasible index change from axial to peripheral core composition results in a maximum numerical aperture only of about 0.15. While this aperture is sufficient to contain the 10,000 or so expected modes for contemplated dimensions, under ideal conditions, deviations from such conditions, such as, inhomogeneity, microbending, etc., may result in some of the higher order modes impinging on the core-clad interface beyond the critical angle. To prevent loss of energy due to such conditions, it is generally desirable to increase $na$. The primary thrust of the present invention is such increased $na$ commensurate with retention—indeed, sometimes improvement in—insensitivity of profile to changing wavelength.

It is appropriate to review this teaching in this portion of the specification since, in some part, at least, Design Criteria, depend on the same considerations as their outline. That is, to a certain extent at least optimum profiling depends upon the structural variation produced in the peripheral core region, which after all, as in the copending application Ser. No. 612,646 filed on Sept. 12, 1975 is a simple, binary borosilicate glass composition. Phosphosilicate composition grading, on the other hand, follows the linear relationship observed and reported by others for the usual modifying agents, e.g., germania, titania, etc., which rely upon compositional change, per se, for bringing about index change.

As in the copending application, the fiber structure contemplated is normally within the diameter range of from 80–130 $\mu$m as drawn, also, again, $\pm$ 25 percent deviation from this range results only in a minor variation in quenching conditions, and in turn, only a minor variation in peripheral core index. Dimension of the core region (as distinguished from the as drawn structure) is of consequence primarily from the standpoint of mode capacity. The usual diameter range of from 30–80 $\mu$m for the core is contemplated; but deviation does not affect the magnitude or other impact of $\alpha$. It has been generally observed that structural changes produced by addition of $B_2O_3$ to $SiO_2$ are considerably less significant where other ingredients are present. Accordingly, profiling is primarily dependent upon grading of $P_2O_5$ content in the ternary system of the invention.

It has been shown in Equation 2 that:

$$\alpha = 2 + y - \Delta \frac{(4 + y)(3 + y)}{(5 + 2y)}$$

where $y$ equals $$-\frac{2n_1}{N_1} \frac{\lambda}{\Delta} \frac{d\Delta}{d\lambda};$$

$n_1$ is the axial refractive index;
$N_1$ is the axial group refractive index;
$\lambda$ is the wavelength; and $$\Delta = \frac{n_1 - n_2}{n_1}.$$

In accordance with this finding as reported by Olshansky and Keck, supra., values for Equation 2 could be determined by direct measurement in bulk glass of the compositions corresponding with axial and peripheral core compositions, and this teaching is basically applicable to the core of the inventive fiber. The consideration that permits virtual independence of $B_2O_3$ content except in the range of the peripheral core region relates to the fact that $B_2O_3$ has approximately the same index of refraction as $SiO_2$ so that it is not properly considered an index modifier in the composition sense. As in the copending application noted above, use of a bulk-sample measured value of a borosilicate composition corresponding with that of the peripheral core regions results in a parameter which must be corrected to be applicable to the real fiber. As indicated in that copending application, an increment of 0.007 must be subtracted from the bulk glass borosilicate index. Accordingly, where $\Delta$ is to be computed as above described and where measured values are taken from bulk samples, the value of $\Delta$ becomes $$\Delta = \frac{n_1 - (n_2 - 0.007)}{n_1}.$$

Desired $\alpha$ values in accordance with the invention—generally those corresponding with the values graphically set forth on FIG. 2 (although sometimes more broadly defined to include higher $na$ fibers) are calculable in accordance with the above considerations; and due to the peculiarity of the borosilicate binary system, concentrations of index modifiers required for the production of fibers manifesting such profiles may be produced by use of $P_2O_5$ concentrations premised on the usual linear relationship between refractive index and concentration as obtains for other modifiers thus far considered (with the exception of $B_2O_3$).

4. The Example

A flow system is set up within an envelope consisting of a tube of commercial grade fused silica, the dimensions of the tube being 14 mm I.D. by 16 mm O.D. and 90 cm. long. A flowing gas mixture of silicon tetrachloride, $SiCl_4$, boron trichloride, $BCl_3$, and oxygen are introduced at the respective flow rates of 66 cc/minute, 22.6 cc/minute, and 780 cc/minute. Tube and contents are heated by a 17 cm/minute, moving hot zone 5 cm in length produced by a multi-jet oxyhydrogen torch.

Particulate matter is observed to form in the general region of the torch and is observed to travel downstream with such matter lodging as a white deposit on the inner surface of the tube downstream of the hot zone. Deposition is most pronounced over the downstream region of the approximate length 10 cm and trail off to a still perceptible deposit at the exit end of the tube. As the hot zone moves downstream, the visible white deposit fuses to result in a substantially thinner transparent glassy film. The sequence is repeated 35 times with rapid re-traversal of the hot zone following each successive downstream movement. The resulting glass layer of approximate thickness 0.3 mm is designed to serve as an optical clad. A graded core region is thereafter deposited by following the same general procedure with the same rate of movement of the same oxyhydrogen torch assembly, however, varying the composition of the flowing gas mixture from the initial composition over a total of 31 passes with the ultimate composition consisting solely of $POCl_3$, $SiCl_4$ and oxygen in the approximate amounts of 66 cc/minute $SiCl_4$, 12.8 cc/minute $POCl_3$ and 780 cc/minute $O_2$. The amount of $POCl_3$ is increased in accordance with the equation $$\text{Flow rate } POCl_3 = (15.1 \text{ cc/min}) \left[1 - \left(\frac{1}{31^{0.94}}\right)(31 - I)^{0.94}\right]$$

and $BCl_3$ in accordance with the equation $$\text{Flow rate } BCl_3 = \left(\frac{22.6 \text{ cc/min}}{31^{1.18}}\right)(31 - I)^{1.18}$$

$BCl_3$ is reduced in which $I$ was the pass number. The total layer thickness produced by the 31 passes is approximately 0.2 mm resulting in a total deposited film thickness of 0.5 mm.

The tube, together with deposited layers, is then collapsed. Collapse is accomplished by stopping gas flow an increasing temperature by gradually decreasing the traversal velocity of the oxyhydrogen torch assembly. Collapse occurs after ten passes at a zone velocity of approximately 1.2 cm/minute. Collapsing is visually observed as conversion of tube and contents to a solid rod in the direction of torch movement.

The collapsed assembly, now known as a preform, is of approximate dimensions 9 mm diameter and 35 cm long. This length, representing the region of uniform deposition, is removed from the entire original tube by local melting and drawing to severance.

Fiber drawing to produce a fiber of an approximate outside diameter of 100 micrometers is produced by passing the preform through a muffle furnace which results in local heating to a temperature of approximately 2,000 degrees C and by pulling the heated region at a steady state velocity of approximately 1 meter/second. The ultimate fiber length is approximately 1100 meters with such length being limited by the fiber drawing facility.

The wavelength range of 0.5 – 1.1 $\mu$m discussed above is premised on a near-perfect independence of $\alpha$ on wavelength (i.e., approximately ± 2 percent). A useful range with somewhat greater wavelength dependence (e.g., ± 5 percent) results over extensions in operation from 1.1 $\mu$m to at least 2 $\mu$m. Since this variation is sufficiently small to meet many criteria, the invention is generically described in terms of the overall wavelength range of operation of from 0.5 to 2.0 $\mu$m.

What is claimed is:

1. Glass transmission line for the transmission of electromagnetic radiation centering about a wavelength within the range of from 0.5 to 2.0 $\mu$m, said line comprising a <u>core</u> member manifesting a radially decreasing <u>refractive index</u> for said radiation from the axial core composition to the peripheral core composition, together with a <u>cladding</u> about said core, in which the said <u>core</u> consists essentially of $SiO_2$ and at least two refractive index <u>modifying ingredients</u>, in which the gradient within the said core is due at least in part to a radially increasing concentration of boron oxide, $B_2O_3$, to an ultimate peripheral core composition which is essentially borosilicate containing from 10 mole percent $B_2O_3$ to 20 mole percent $B_2O_3$, the said gradient approximating the form:

$$n = n_1 \left[1 - 2\Delta\left(\frac{r}{a}\right)^\alpha\right]^{\frac{1}{2}},$$

in which the $n_1$, is the index maximum, $r$ is the distance from the fiber axis, $a$ is the core radius, $\Delta$ is the relative index difference between core center and cladding and $\alpha$ is a power law exponent which characterizes the profile, characterized in that the said gradient is due, at least in part, to a radially decreasing concentration of phosphorous pentoxide, $P_2O_5$, from an axial core composition containing from 10 mole percent $P_2O_5$ to 15 mole percent.

2. Line of claim 1 in which the axial core composition consists essentially of phosphosilicate glass and in which the peripheral core composition consists essentially of borosilicate glass.

3. Line of claim 2 in which $\Delta$ in the equation set forth in claim 1 is equal to $$\frac{n_1 - (n_2 - 0.007)}{n_1},$$

$n_1$ and $n_2$ are index values as measured in bulk samples of glass of the compositions represented, respectively, by the axial core composition and the peripheral core composition.

4. Line of claim 1 in which $\alpha$, the exponent in the equation set forth in claim 1, is equal to approximately 1.9 and in which the electromagnetic radiation centers about a wavelength range of from 0.5 to 1.1 $\mu$m.

* * * * *

UNITED STATES PATENT AND TRADEMARK OFFICE
CERTIFICATE OF CORRECTION

PATENT NO. : 4,033,667

DATED : July 5, 1977

INVENTOR(S) : James W. Fleming, Jr.

It is certified that error appears in the above-identified patent and that said Letters Patent are hereby corrected as shown below:

Column 1, line 24, "as" should read --is--.
Column 2, line 48, "1.1. µm" should read --1.1 µm--.
Column 5, line 11, "sometimes in" should read --sometimes described in--.

Signed and Sealed this

Seventeenth Day of October 1978

[SEAL]

Attest:

RUTH C. MASON
*Attesting Officer*

DONALD W. BANNER
*Commissioner of Patents and Trademarks*